US011349936B2

United States Patent
Momchilov et al.

(10) Patent No.: US 11,349,936 B2
(45) Date of Patent: May 31, 2022

(54) SYSTEM AND RELATED METHODS PROVIDING CHANNEL SWITCHING BETWEEN APPLIANCES

(71) Applicant: CITRIX SYSTEMS, INC., Fort Lauderdale, FL (US)

(72) Inventors: Georgy Momchilov, Parkland, FL (US); Jeroen Mattijs Van Rotterdam, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/885,430

(22) Filed: May 28, 2020

(65) Prior Publication Data

US 2021/0377349 A1    Dec. 2, 2021

(51) Int. Cl.
*G06F 15/173* (2006.01)
*H04L 67/148* (2022.01)

(52) U.S. Cl.
CPC .................................. *H04L 67/148* (2013.01)

(58) Field of Classification Search
CPC ....... H04L 69/14; H04L 45/24; H04L 47/825; H04L 67/10; H04L 47/125; H04L 63/0281; G06F 9/45558; G06F 2009/45595; G06F 2009/4557; G06F 9/452; G06F 9/455; G06F 9/00; G06F 2009/45583
See application file for complete search history.

(56) References Cited

U.S. PATENT DOCUMENTS

| 10,547,551 B2 | 1/2020 | Narayanan | |
| 2014/0045478 A1* | 2/2014 | Moshfeghi | H04B 7/0689 455/418 |
| 2014/0304412 A1 | 10/2014 | Prakash et al. | |
| 2015/0339136 A1* | 11/2015 | Suryanarayanan | G06F 9/455 718/1 |
| 2016/0212102 A1* | 7/2016 | Xu | H04L 63/18 |
| 2018/0241824 A1* | 8/2018 | He | H04L 12/4641 |
| 2019/0097883 A1 | 3/2019 | Tiwari et al. | |
| 2019/0319873 A1 | 10/2019 | Shelar et al. | |
| 2019/0339997 A1 | 11/2019 | Momchilov | |
| 2019/0342364 A1 | 11/2019 | Vysotsky et al. | |
| 2019/0342426 A1 | 11/2019 | Momchilov | |
| 2019/0386904 A1 | 12/2019 | Srivatsan et al. | |

OTHER PUBLICATIONS

Rachuri et al. "Network-Coded SO-WAN in Multi-Access Systems for Delay Control" 2019 International Conference on Contemporary Computing and Informatics (IC3I). IEEE. Dec. 12, 2019 (Dec. 12, 2019), pp. 32-37.

* cited by examiner

*Primary Examiner* — Ryan J Jakovac
(74) *Attorney, Agent, or Firm* — Allen, Dyer, Doppelt + Gilchrist, PA

(57) ABSTRACT

A computing system may include a first appliance and a plurality of second appliances connected to different Points of Presence (PoPs). The second appliance may be connected to the first appliance by a plurality of different channels. The first appliance may be configured to establish a virtual connection across the plurality of different channels for data communication through the PoPs, and to switch the different channels between the second appliances without interrupting the virtual connection.

18 Claims, 9 Drawing Sheets

SYSTEM AND RELATED METHODS PROVIDING CHANNEL SWITCHING BETWEEN APPLIANCES

BACKGROUND

Software-defined networking (SDN) is an approach to computer networking that allows network administrators to manage network services through abstraction of lower-level functionality. This is done by decoupling the system that makes decisions about where traffic is sent from the underlying systems that forward traffic to the selected destination.

SUMMARY

A computing system may include a first appliance and a plurality of second appliances connected to different Points of Presence (PoPs). The second appliance may be connected to the first appliance by a plurality of different channels. The first appliance may be configured to establish a virtual connection across the plurality of different channels for data communication through the PoPs, and to switch the different channels between the second appliances without interrupting the virtual connection.

In an example embodiment, the first appliance may be connected to a client device, and the PoPs may be connected to a server. By way of example, the server may be a virtual delivery server configured to connect the client device with a virtual session, or it may be configured to provide a Software as a Service (SaaS) application session to the client.

In an example configuration, the first and second appliances may be configured to provide software-defined networking in a wide area network. By way of example, the different channels may comprise at least some of very small aperture terminal (VSAT) channels, cellular channels, local area network (LAN) channels, wireless LAN channels, and satellite communication channels.

In some example implementations, at least one of the channels may comprise a multi-stream channel. More particularly, the multi-stream channel(s) may comprise at least some of a graphics stream, user input stream, printing stream, multimedia stream, and drive mapping stream, for example. Furthermore, the first appliance may be further configured to transition between single-stream and multi-stream communication across at least one of the channels based upon changes in availability of the PoPs. Also in an example configuration, the first appliance may be configured to ping the second appliances to determine a level of service associated therewith, and switch the channels between the second appliances based upon the determined level of service.

A related computing device, such as the first appliance discussed briefly above, and a related method are also provided. The method may include establishing a virtual connection across a plurality of different channels connecting a first appliance to a plurality of second appliances. The second appliances may be connected to different PoPs, and the virtual connection may be for communicating data through the PoPs. The method may further include switching the different channels between the second appliances without interrupting the virtual connection.

DETAILED DESCRIPTION

Traditional wide area network (WAN) optimization techniques, such as software-defined WAN (SD-WAN) technologies, use a selection mechanism to connect to a Point of Presence (PoP) using multiple connections. However, during operation, network conditions are subject to change in terms of latency, bandwidth, etc., based upon network usage. SD-WAN also has the ability to combine multiple connections into a single virtual connection between the client and the PoP. The approach set forth herein advantageously pings multiple PoPs to detect whether a different PoP offers a better service during transmission. If a PoP with a better level of service is detected, an appliance associated with the client (e.g., an SD-WAN appliance) has the ability to switch one or multiple connections to that PoP or other POPs, yet without interrupting the virtual connection across the PoPs.

In contrast to traditional configurations, the approach set forth herein allows for the determination of the PoP providing "best service" to be dynamic and, additionally, multiple PoPs may be used simultaneously in an aggregated fashion. As one benefit, the aggregation of PoPs may provide higher/aggregated overall bandwidth, taking advantage of different PoPs that provide different QoS for different types of traffic.

Figure 1:
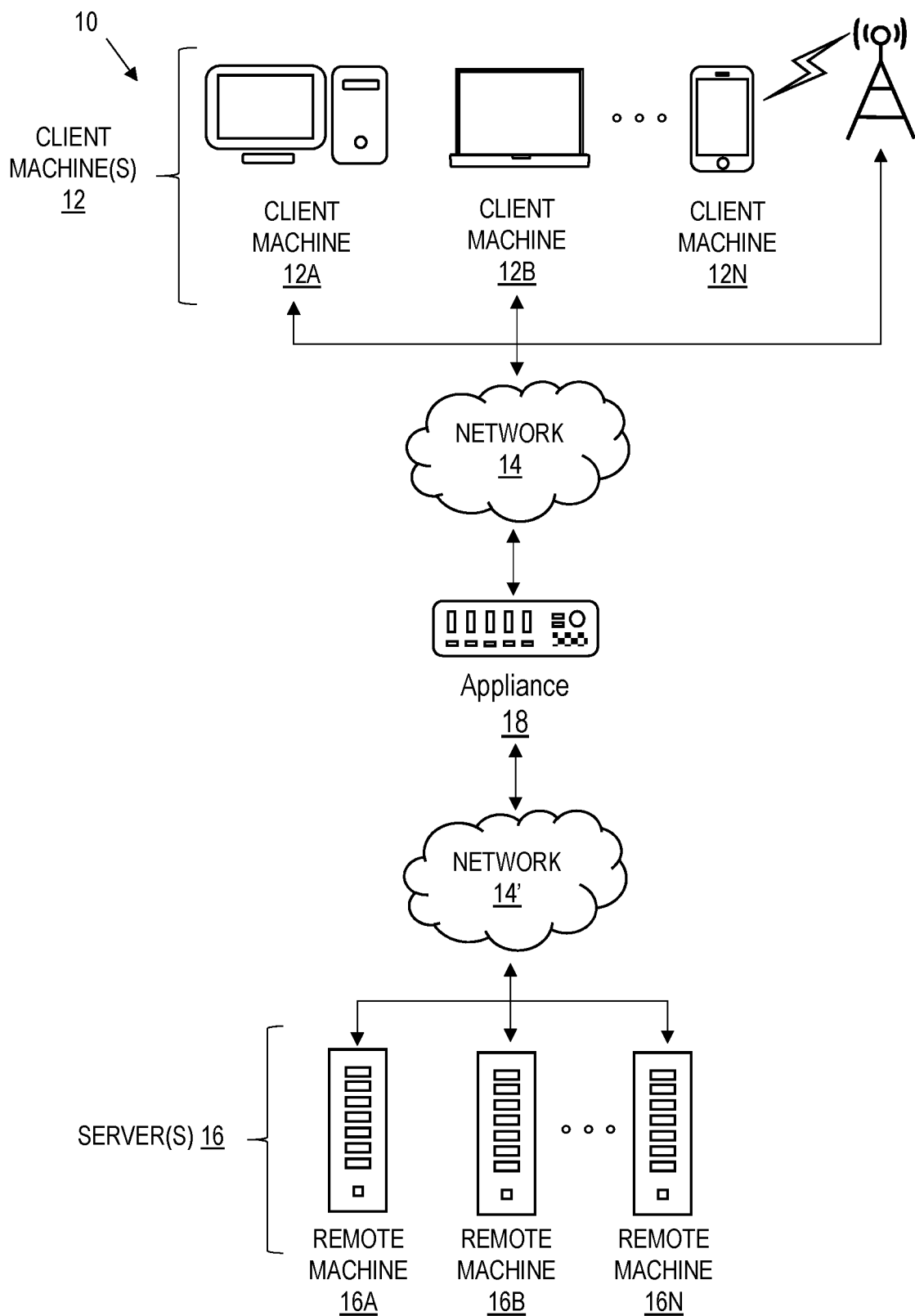
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
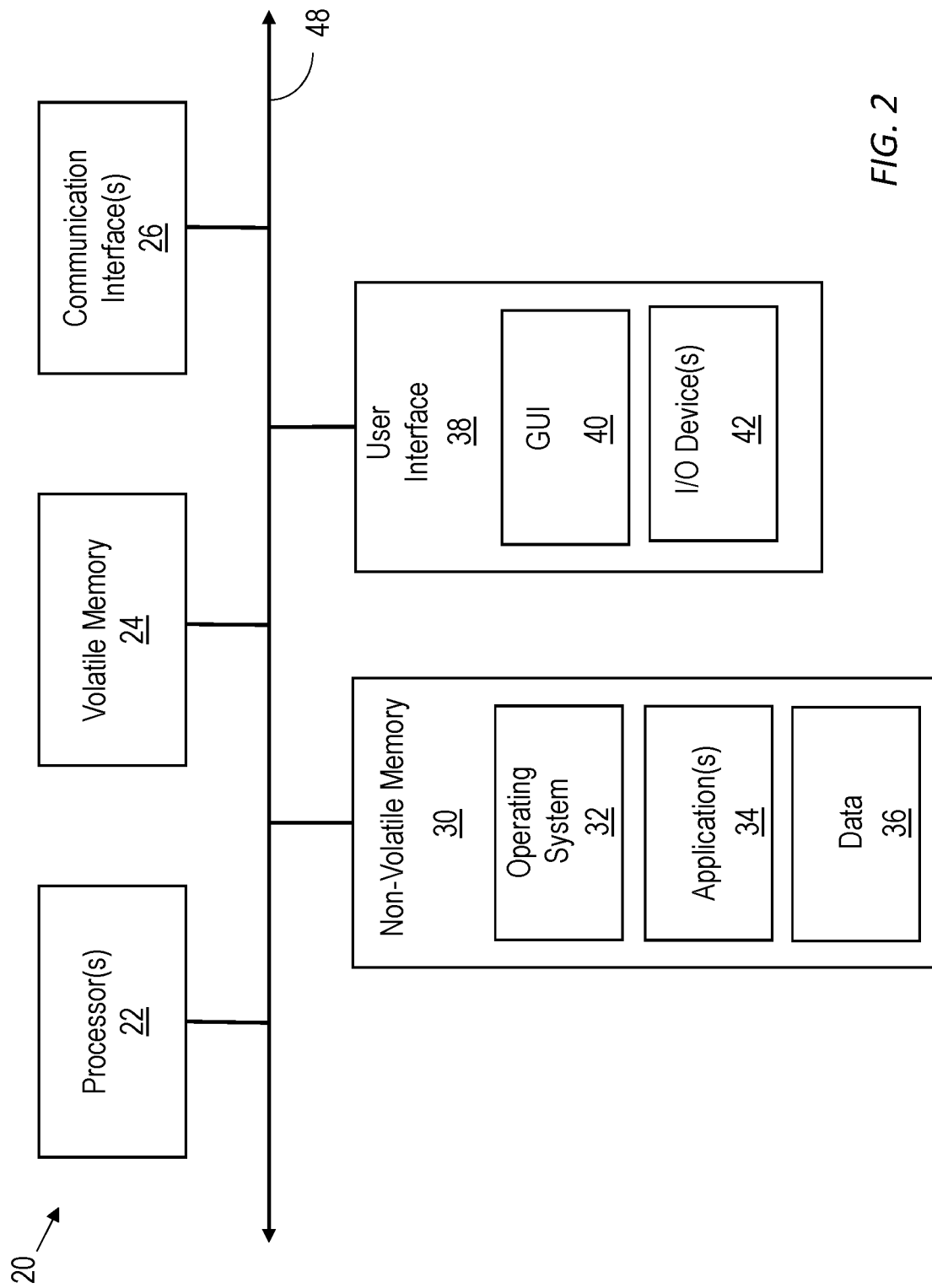
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Fla. ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
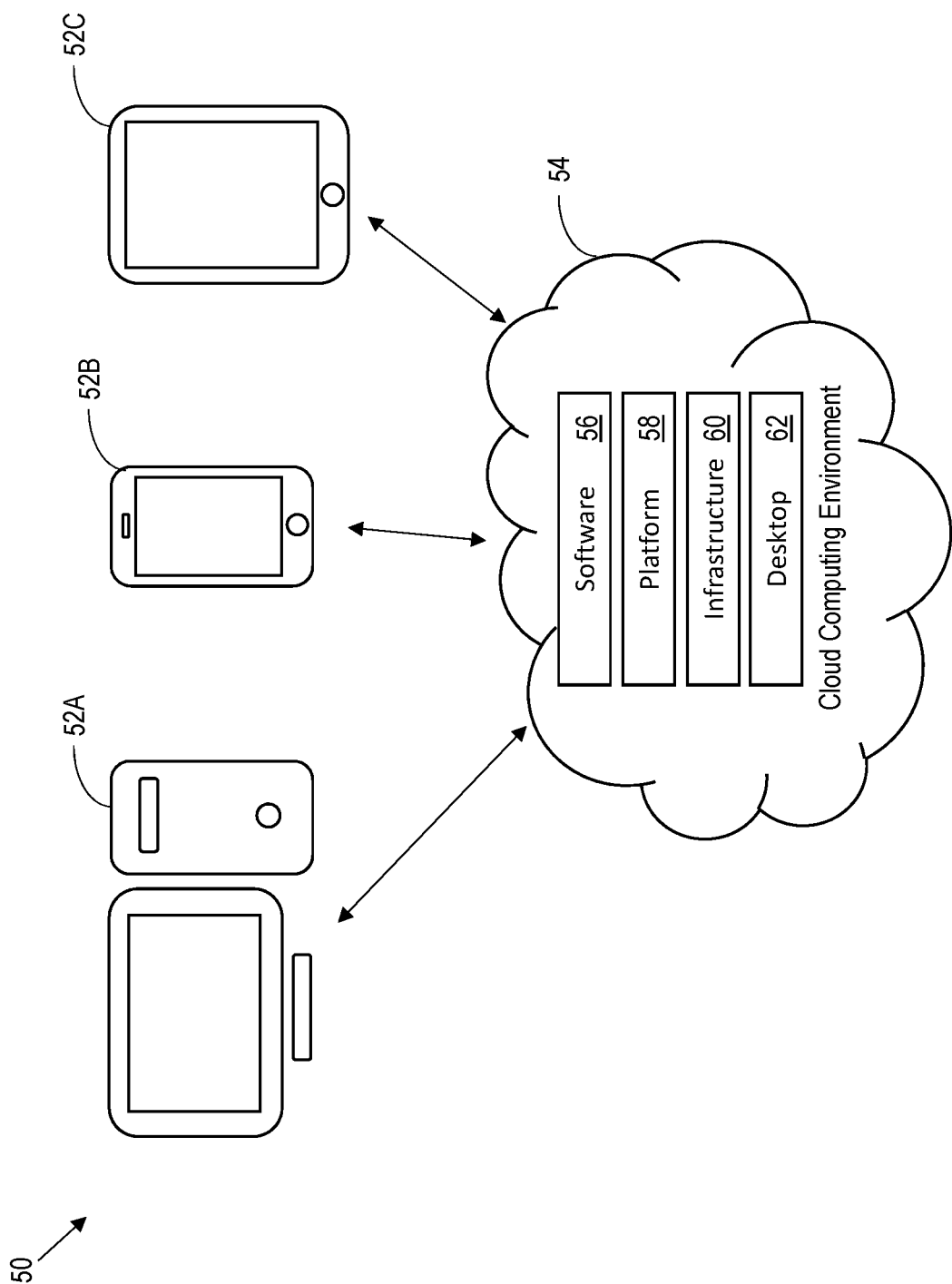
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

Figure 4:
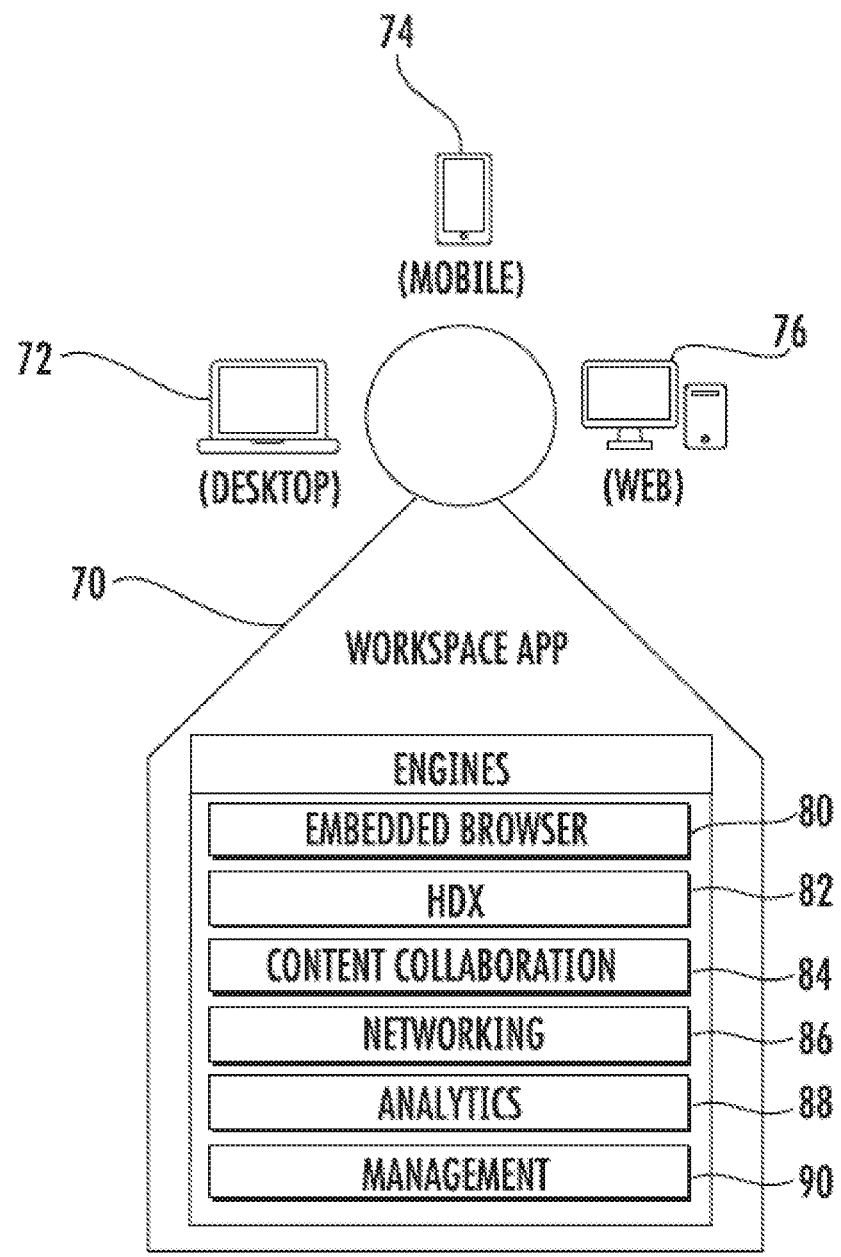
FIG. 4 is a schematic block diagram of desktop, mobile and web-based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific μ-VPN connection. A μ-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
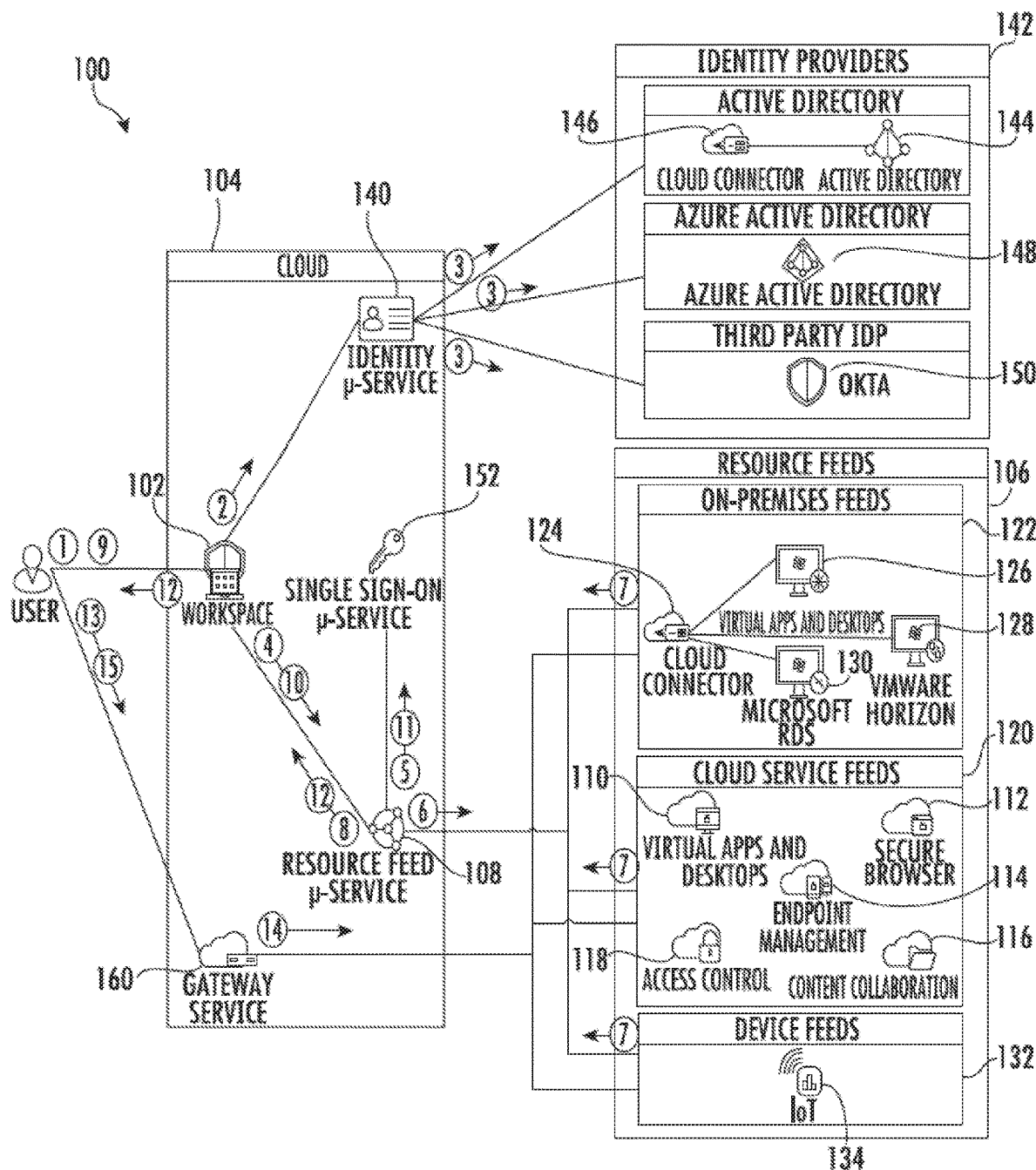
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Cloud 104. The workspace experience service 102 then pulls in all the different resource feeds 16 via a resource feed micro-service 108. That is, all the different resources from other services running in the Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Cloud 104, and presenting their identity (event 1). The identity includes a user name and password, for example.

The workspace experience service 102 forwards the user's identity to an identity micro-service 140 within the Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
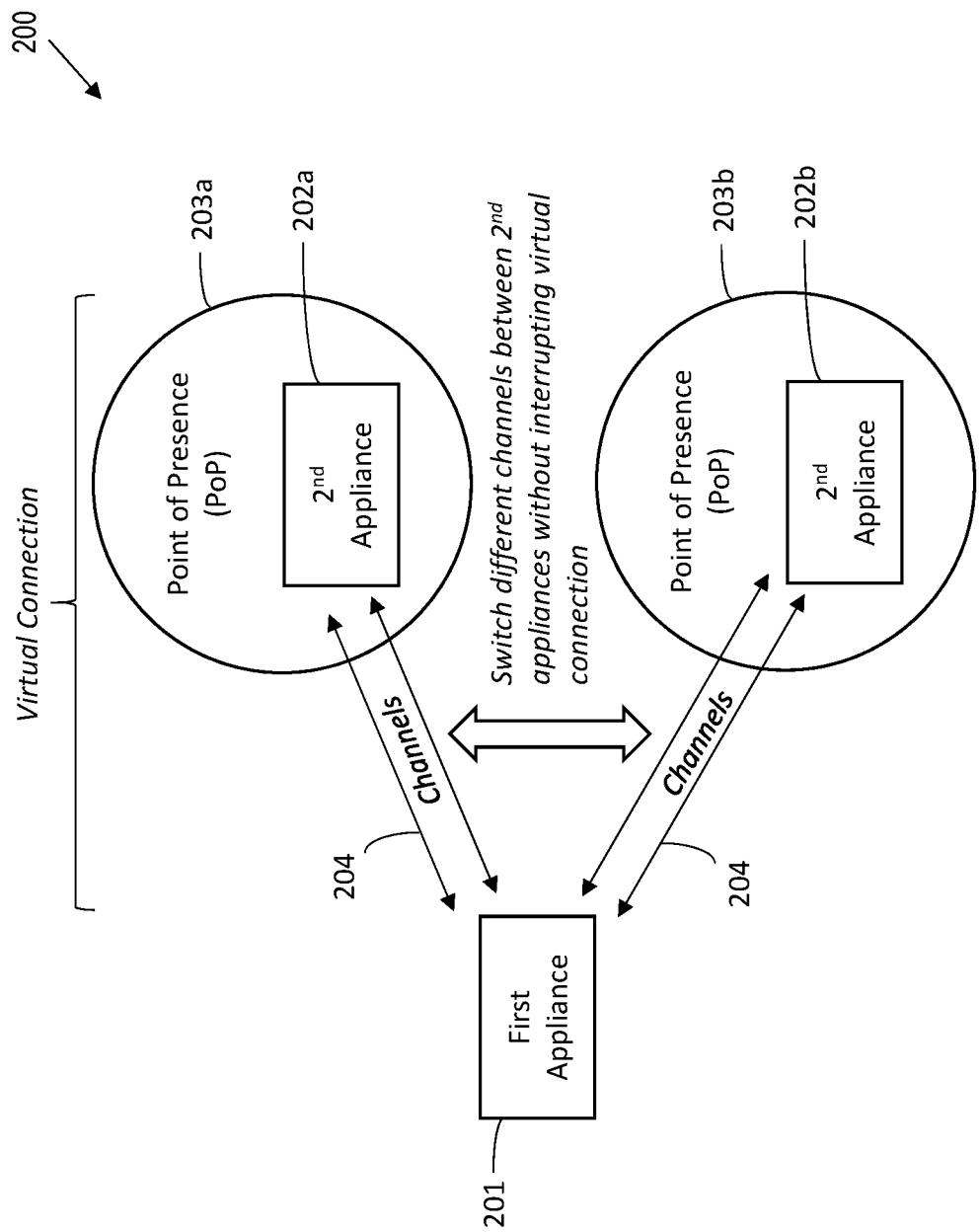
FIG. 6 is a schematic block diagram of a computing system providing switching of channels between a first appliance and a plurality of second appliances in accordance with an example embodiment.
Figure 7:
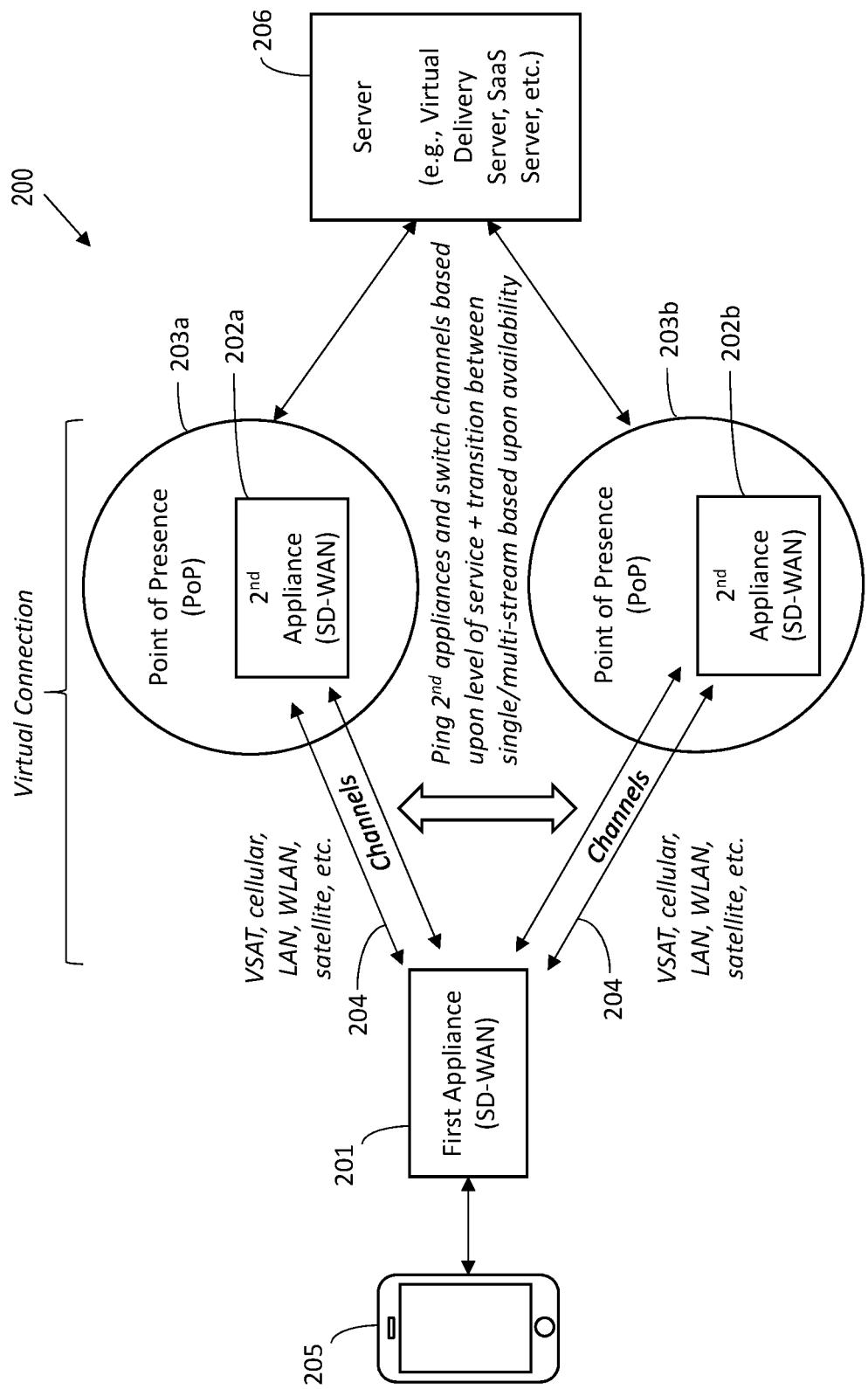
FIG. 7 is a schematic block diagram of an example implementation of the computing system of FIG. 6 connecting a client device to a server.

Referring now to FIGS. 6 and 7, a computing system 200 illustratively includes a first appliance 201 and a plurality of second appliances 202a, 202b connected to or otherwise in communication with different respective network interface devices, such as Points of Presence (PoPs) 203a, 203b. A PoP is an interface between different network entities, such as an Internet PoP that allows client devices to connect with the Internet. PoPs are also typically region based, e.g. US-East versus US-West, US-Central, Asia-Pacific, etc. Moreover, in some instances there may be PoPs for government sector versus public sector use, with strict allocation of customers and no failover between them. The first and second appliances 201 and 202a, 202b may be SD-WAN appliances or controllers, with the first appliance being connected with a client device 205 and the second appliances being connected with a server 206 or other computing device via the PoPs 203a, 203b. By way of example, the client device 205 may be a smartphone, tablet computer, laptop or desktop computer, etc.

One particularly advantageous implementation of SD-WAN enterprises is provided by Citrix SD-WAN, which allows enterprises to render their WANs with more scalability, and in a cost-effective way that is ready to connect to the cloud. Citrix SD-WAN contains an integrated database and deep packet inspection to identify applications, including individual SaaS applications, and intelligently steer traffic from the branch to the internet, cloud, or SaaS. Moreover, Citrix SD-WAN also provides the ability to route traffic from the branch to the internet via a secure web gateway, delivering cloud-based security including firewall, URL filtering, and usage accounting. The embodiments described herein may not only be implemented within the context of the network environments described above with reference to FIGS. 1-5, but also within the Citrix SD-WAN framework, although other suitable SD-WAN and/or network routing infrastructures may also be used.

Furthermore, the first appliance 201 is illustratively connected to the second appliances 202a, 202b by, and communicates over, a plurality of different channels 204, as will be discussed further below. The first appliance 201 is configured to establish a virtual connection across the plurality of different channels 204 for communicating data between the client device 205 and the server 206 through the PoPs 203a, 203b. As will also be discussed further below, the first appliance 201 is further advantageously configured to switch the different channels 204 between the second appliances 202a, 202b to take advantage of different levels of Quality of Service (QoS) of the PoPs 203a, 203b (which are subject to change over time), yet without interrupting the virtual connection.

By way of example, the server 206 may be a virtual delivery server providing a virtual session (e.g., virtual desktop or apps), Software as a Service (SaaS) session, Desktop as a Service (DaaS) session, etc., to the client device 205. However, it will be appreciated that the virtual connection established between the first appliance 201 and the second appliances 202a, 202b may be used for communicating with computing devices other than the client device 205 and/or server 206 in different embodiments, such as Internet of Things (IoT) devices, etc. Moreover, it should be noted that while only two second appliances 202a, 202b and associated PoPs 203a, 203b are shown in the illustrated example, other numbers may be used in different embodiments.

The different channels 204 may include one or more of very small aperture terminal (VSAT) channels, cellular channels (e.g., LTE), local area network (LAN) channels, wireless LAN channels, satellite communication channels, etc. The first appliance 201 may advantageously be configured to ping the second appliances 202a, 202b to determine a QoS associated with the second appliance and/or its respective PoP 203a, 203b, and switch the channels 204 between the second appliances based upon the determined levels of service. In other embodiments, the first appliance 201 may advantageously be configured to independently measure the network characteristics such as bandwidth, latency (round trip time), packet loss, etc., to determine the QoS over the different channels 204 between the second appliances 202*a*, 202*b*, and switch the channels 204 between the second appliances based upon the determined levels of service.

More particularly, SD-WAN appliances are typically configured to provide statistics or measurements with respect to factors such as jitter, round trip time, bandwidth, etc. Moreover, typical SD-WAN controllers attempt to optimize speed for client communications. For example, a typical SD-WAN client/server controller pair might distribute client/server communications data between a WiFi channel and an LTE channel, which together form a single virtual connection between the client/server SD-WAN controllers. Using both connections allows for the aggregation of bandwidth, and the potential for a more stable connection.

However, as network connections and usage change over time, problems may arise with such a bandwidth-enhancing configuration. That is, communications between the client device 205 and the first appliance 201 are serial communications, but when serial data packets are distributed across different channels there is a possibility that if a packet(s) is dropped on one of the channels, the receiving SD-WAN controller would have to wait for the dropped packet(s) to be re-sent or arrive from another stream before performing operations such as decompression/decryption. Yet, in the system 200, the first appliance 201 may advantageously switch the above-described channels 204 as the second appliances 202*a*, 202*b* reply to pings with updated level of service information, to advantageously help reduce the possibility of dropped packets or other delays causing a degradation of the level of service of one or more channels. Thus, in the above example the first appliance 201 might switch the LTE connection to one of the second appliances 202*a*, 202*b*, while routing the WiFi connection to the other second appliance based upon the level of service response it receives from the second appliances.

In some implementations, the client device 205 may also route specific traffic, such as virtual channels in a virtualized environment, to specific PoPs 203*a*, 203*b* depending on the characteristics of the connection to these PoPs. Such virtual channels may be for graphics, user input, printing, multimedia, device redirection, client drive mapping (file transfer), etc. For example, if PoP 203*a* offered higher bandwidth but relatively high latency, while PoP 203*b* offered lower bandwidth but relatively low latency, then the virtual channels for print traffic, multimedia, device redirection, and client drive mapping (file transfer) may be routed to the PoP 203*a*, while virtual channels for interactive traffic (e.g., keyboard, mouse, touch, pen, or interactive graphics traffic) may be routed to PoP 203*b* so that user experience of the client device 205 is not diminished or otherwise negatively impacted by network conditions.

In virtualized environments, traditionally data communicated between the client device 205 and server 206 is routed over a single connection (assuming serialized packet streams). With respect to a multi-PoP SD-WAN approach, virtualized environments can benefit from multiple underlying connections transported over multiple PoPs while the virtual channel data streams, e.g. graphics, user input, printing, etc., are still serialized within a single logical virtual connection. Yet, a typical multi-PoP SD-WAN configuration will serialize packets, waiting for specific packets from the other channel(s) in case they do not arrive in order. Here again, such serialization of a single virtual stream, although still benefitting from multi-PoP routes, may result in suboptimal performance. For example, the single virtual stream may be encrypted using custom presentation-protocol level encryption (e.g., Secure Independent Computing Architec-ture (ICA)), or may be compressed using custom presentation-protocol level compression (e.g., context-based compression within the HDX framework described above). As a result, packets arriving out of order over multiple routes may not be decryptable or decompressable as not all of the packets used during encryption/compression are present for the decryption/decompression processing.

However, the system 30 advantageously provides for streaming of the different virtual channel data streams over individual independent channels or transport connections 204. This advantageously allows for redirection of the streams over different routes via different PoPs 203*a*, 203*b*, applying different QoS levels (as discussed above) and asynchronous processing at the receiving end for enhanced performance. Better performance characterized by higher throughput and interactivity is achieved because the different virtual channel data streams do not have to be serialized. In particular, individual virtual channel data streams may also have separate custom presentation-protocol level encryption and/or compression in accordance with the present approach, one example of which is multi-stream ICA.

Figure 8:
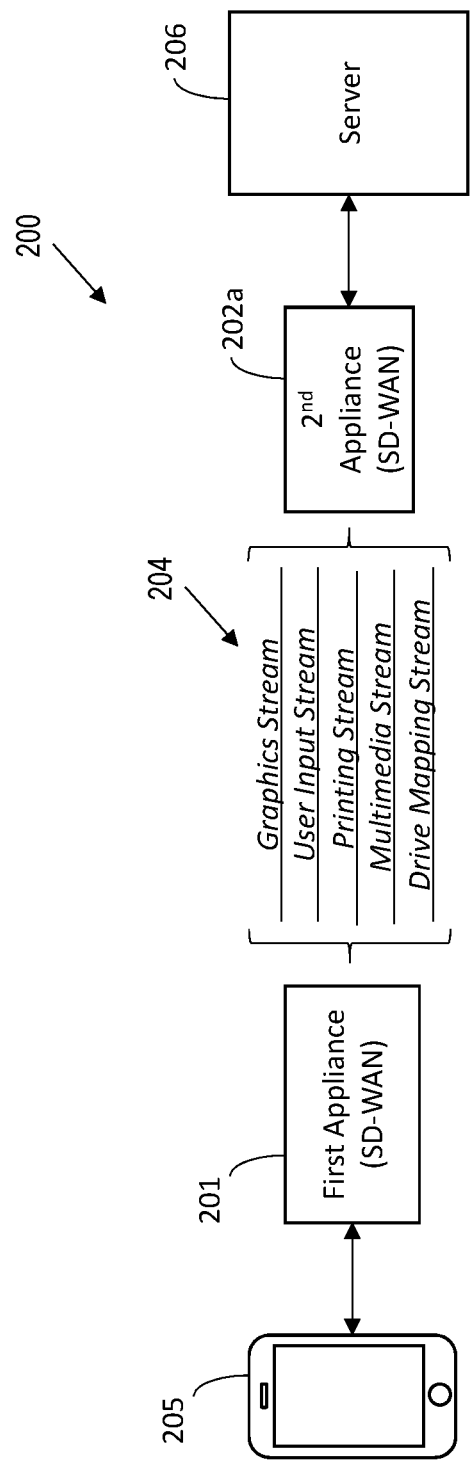
FIG. 8 is a schematic block diagram illustrating an example multi-stream communication configuration which may be used between the first and second appliances of the system of FIG. 7.

An example multi-stream ICA implementation is shown in FIG. 8. Here, one of the channels 204 is configured as a multi-stream ICA channel including a graphics stream, user input stream, printing stream, multimedia stream, and drive mapping stream. Other types and combinations of streams may be used in different embodiments. Furthermore, in some example embodiments the detection of availability of different PoPs 203*a*, 203*b* may trigger a transition from single-stream to multi-stream, e.g., a transition from single-stream ICA to multi-stream ICA. In an example embodiment, the workspace experience service 102 of FIG. 5 may provide the first appliance 201 with multi-path information on location and availability of the different PoPs 203*a*, 203*b*. In another example embodiment, a single PoP, e.g. PoP 203*a*, may provide the first appliance 201 with information on location and availability of a different PoP, e.g. PoP 203*b*. In yet another example embodiment, the detection of availability of different PoPs 203*a*, 203*b*, may be performed by a second appliance, e.g. second appliance 202*a*, inserting protocol tags in the data stream indicative of different PoPs 203*a*, 203*b*. Moreover, changes in PoP network conditions may also trigger a dynamic re-assignment of the virtual channels to different PoPs 203*a*, 203*b* by the first appliance 201. In another example embodiment, the second appliance, e.g. second appliance 202*a* or 202*b*, may perform the dynamic re-assignment of the virtual channels. The second appliances 202*a*, 202*b* may also exchange information on network conditions through the different PoPs 203*a*, 203*b*. In yet another example embodiment, the client device 205 or the server 206 may trigger the dynamic re-assignment of the virtual channels. By way of example, if the PoP 203*a* provides good throughput but with high latency and/or high packet loss, and the PoP 203*b* provides low latency and/or low packet loss yet with lower bandwidth, streams for which higher throughput is desirable may be routed to the PoP 203*a*, whereas streams for which less latency and/or packet loss can be tolerated may be routed to the PoP 203*b*.

Switching the different channels 204 between the second appliances 202*a*, 202*b* may be advantageously performed without interrupting the virtual connection. In particular, in an example embodiment, the first appliance 201 may collaborate with the second appliance 202*a* to "flush" existing buffered protocol exchanged between the client device 205 and the server 206, before proceeding with routing protocol between the first appliance 201 and the second appliance 202*b*. Although protocol for the virtual connection is properly serialized and not interrupted, the wait for protocol flushing to complete may cause a temporary delay in the communication between the client device 205 and the server 206, the delay being proportionate to the sum of the network latencies of the communication through PoP 203a and PoP 203b. In another embodiment, the first appliance 201 may proceed with routing protocol between the first appliance 201 and the second appliance 202b in parallel to collaborating with the second appliance 202a to "flush" existing buffered protocol exchanged between the client device 205 and the server 206. Furthermore, the first appliance 201 and the second appliances 202a, 202b may light-weight tag, e.g. with timestamps or sequence numbers, the protocol to allow proper serialization by client device 205 and the server 206 (depending on the direction of traffic) of the flushed data stream (via PoP 203a) and the newly routed data stream (via PoP 203b). Thus, the protocol for the virtual connection is not only properly serialized and not interrupted, but the temporary delay in the communication between the client device 205 and the server 206 is proportionate to only the maximum of the network latencies of the communication through PoP 203a and PoP 203b respectively. The aforementioned approaches apply to switching of the channels 204 in both single-stream and multi-stream scenarios, as well as transitions from single-stream to multi-stream or vice versa.

Figure 9:
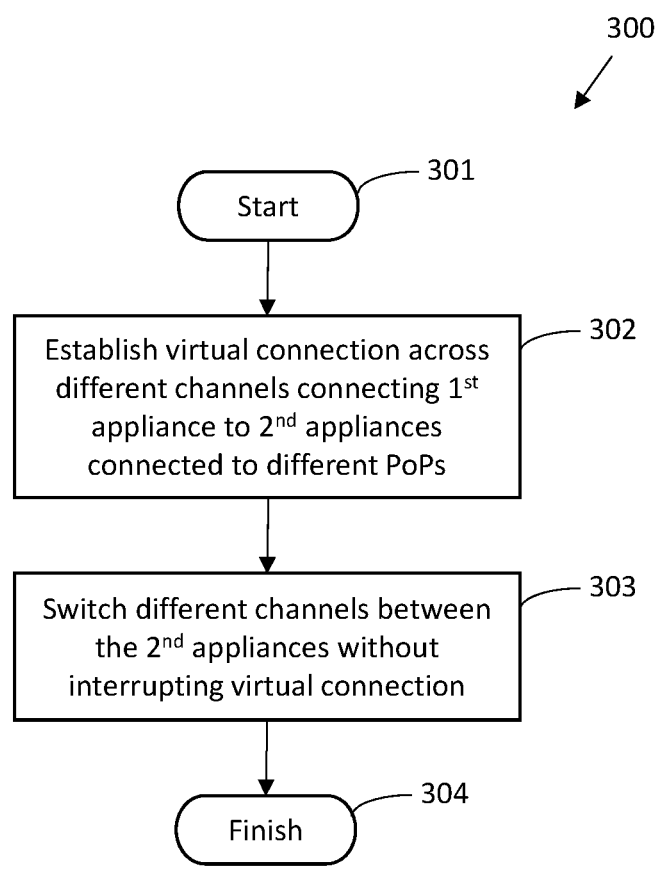
FIG. 9 is a flow diagram illustrating method aspects associated with the computing system of FIG. 6.

A related method is now described with reference to the flow diagram 300 of FIG. 9. The method begins (Blocks 301, 302) with establishing a virtual connection across the plurality of different channels 204 connecting the first appliance 201 to the second appliances 202a, 202b. As discussed above, the second appliances 203a, 203b are connected to different PoPs 203a, 203b. The method further illustratively includes switching the different channels 204 between the second appliances 202a, 202b without interrupting the virtual connection, at Block 303, which illustratively concludes the method of FIG. 9 (Block 304).

As will be appreciated by one of skill in the art upon reading the foregoing disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A method comprising:
   establishing a virtual connection across a plurality of different channels connecting a first computing device to a plurality of second computing devices, individual channels including a plurality of different data streams, the second computing devices providing access to a communications network, the virtual connection for communicating data through the second computing devices over the network; and
   switching the different channels between the second computing devices, and switching the data streams between the different channels, responsive to levels of service available and without interrupting the virtual connection;
   wherein the first and second computing devices are configured to provide software-defined networking in a wide area network.

2. The method of claim 1 wherein the first computing device is connected to a client device, and the second computing devices are connected to a server over the network.

3. The method of claim 2 wherein the server comprises a virtual delivery server.

4. The method of claim 2 wherein the server comprises a Software as a Service (SaaS) server.

5. The method of claim 1 wherein the different channels comprise at least some of very small aperture terminal (VSAT) channels, cellular channels, local area network (LAN) channels, wireless LAN channels, and satellite communication channels.

6. The method of claim 1 wherein the plurality of different data streams comprise at least some of a graphics stream, user input stream, printing stream, multimedia stream, and drive mapping stream.

7. The method of claim 1 further comprising, at the first computing device, pinging the second appliances to determine the level of service associated therewith, and switching the channels between the second computing devices based upon the determined levels of service.

8. The method of claim 7 further comprising, at the first computing device, comparing the determined level of service to a threshold responsive to the ping, and switching the channels responsive to the determined level of service falling below the threshold.

9. The method of claim 1 wherein the second computing devices access the network via Points of Presence (PoPs); and further comprising, at the first computing device, transitioning between single-stream and multi-stream communication across at least one of the channels based upon changes in availability of the PoPs.

10. A computing system comprising:
    a first computing device; and
    a plurality of second computing devices connected to different Points of Presence (PoPs), and connected to the first computing device by a plurality of different channels, individual channels including a plurality of different data streams;
    wherein the first computing device is configured to establish a virtual connection across the plurality of different channels for data communication through the PoPs, and to switch the different channels between the second computing devices, and switch the data streams between the different channels, responsive to different levels of service available from the second computing devices for the channels and without interrupting the virtual connection;
    wherein the first and second computing devices are configured to provide software-defined networking in a wide area network.

11. The computing system of claim 9 wherein the first computing device is connected to a client device, and the PoPs are connected to a server over the Internet.

12. The computing system of claim 9 wherein the different channels comprise at least some of very small aperture terminal (VSAT) channels, cellular channels, local area network (LAN) channels, wireless LAN channels, and satellite communication channels.

13. A computing device comprising:
a memory and a processor configured to cooperate with the memory to
establish a virtual connection across a plurality of different channels connecting the processor to a plurality of other computing devices, individual channels including a plurality of different data streams, the other computing devices connected to different Points of Presence (PoPs), the virtual connection for communicating data through the PoPs, and
switch the different channels between the other computing devices, and switch the data streams between the different channels, responsive to different levels of service available from the other computing devices for the channels without interrupting the virtual connection;
wherein the processor and the other computing devices are configured to provide software-defined networking in a wide area network.

14. The computing device of claim 13 wherein the processor is connected to a client device, and the PoPs are connected to a server over the Internet.

15. The computing device of claim 13 wherein the different channels comprise at least some of very small aperture terminal (VSAT) channels, cellular channels, local area network (LAN) channels, wireless LAN channels, and satellite communication channels.

16. A non-transitory computer-readable medium having computer-executable instructions for causing a first computing device to perform steps comprising:
establishing a virtual connection across a plurality of different channels connecting the first computing device to a plurality of second computing devices, individual channels including a plurality of different data streams, the second computing devices connected to different Points of Presence (PoPs), the virtual connection for communicating data through the PoPs; and
switching the different channels between the second computing devices, and switching the data streams between the different channels, responsive to different levels of service available from the second computing devices for the channels without interrupting the virtual connection;
wherein the first computing device and the second computing devices are configured to provide software-defined networking in a wide area network.

17. The non-transitory computer-readable medium of claim 16 wherein the first computing device is connected to a client device, and the PoPs are connected to a server over the Internet.

18. The non-transitory computer-readable medium of claim 16 wherein the different channels comprise at least some of very small aperture terminal (VSAT) channels, cellular channels, local area network (LAN) channels, wireless LAN channels, and satellite communication channels.

* * * * *